(12) United States Patent  
Chen

(10) Patent No.: US 8,010,358 B2  
(45) Date of Patent: Aug. 30, 2011

(54) VOICE RECOGNITION WITH PARALLEL GENDER AND AGE NORMALIZATION

(75) Inventor: Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1046 days.

(21) Appl. No.: 11/358,272

(22) Filed: Feb. 21, 2006

(65) Prior Publication Data

US 2007/0198261 A1  Aug. 23, 2007

(51) Int. Cl.
*G10L 17/00* (2006.01)
*G10L 15/28* (2006.01)
*G10L 15/14* (2006.01)

(52) U.S. Cl. ........ 704/246; 704/207; 704/208; 704/250; 704/255; 704/256; 704/256.2

(58) Field of Classification Search ................. 704/250, 704/255, 256, 246, 270.1, E15.009, 245, 704/207, 208, 256.2
See application file for complete search history.

(56) References Cited

U.S. PATENT DOCUMENTS

| | | | |
|---|---|---|---|
| 4,956,865 A | 9/1990 | Lehnig et al. | 704/241 |
| 4,977,598 A | 12/1990 | Doddington et al. | 704/255 |
| RE33,597 E | 5/1991 | Levinson et al. | 704/256 |
| 5,031,217 A | 7/1991 | Nishimura | 704/256.4 |
| 5,050,215 A | 9/1991 | Nishimura | 704/256.4 |
| 5,129,002 A | 7/1992 | Tsuboka | 704/246 |
| 5,148,489 A | 9/1992 | Erell et al. | 704/226 |
| 5,222,190 A | 6/1993 | Pawate et al. | 704/200 |
| 5,228,087 A | 7/1993 | Bickerton | 704/232 |
| 5,345,536 A | 9/1994 | Hoshimi et al. | 704/243 |
| 5,353,377 A | 10/1994 | Kuroda et al. | 704/256.1 |
| 5,438,630 A | 8/1995 | Chen et al. | 382/159 |
| 5,455,888 A | 10/1995 | Iyengar et al. | 704/203 |
| 5,459,798 A | 10/1995 | Bailey et al. | 382/218 |
| 5,473,728 A | 12/1995 | Luginbuhl et al. | 704/243 |
| 5,502,790 A | 3/1996 | Yi | 704/256 |
| 5,506,933 A | 4/1996 | Nitta | 704/256 |
| 5,509,104 A | 4/1996 | Lee et al. | 704/256 |

(Continued)

FOREIGN PATENT DOCUMENTS

EP  0866442  9/1998

(Continued)

OTHER PUBLICATIONS

L. Lee, R. C. Rose, "A frequency warping approach to speaker normalization," in IEEE Transactions on Speech and Audio Processing, vol. 6, No. 1, pp. 49-60, Jan. 1998.*

(Continued)

*Primary Examiner* — James S Wozniak
*Assistant Examiner* — Edgar Guerra-Erazo
(74) *Attorney, Agent, or Firm* — Joshua D. Isenberg; JDI Patent

(57) ABSTRACT

Methods and apparatus for voice recognition are disclosed. A voice signal is obtained and two or more voice recognition analyses are performed on the voice signal. Each voice recognition analysis uses a filter bank defined by a different maximum frequency and a different minimum frequency and wherein each voice recognition analysis produces a recognition probability $r_i$ of recognition of one or more speech units, whereby there are two or more recognition probabilities $r_i$. The maximum frequency and the minimum frequency may be adjusted every time speech is windowed and analyzed. A final recognition probability $P_f$ is determined based on the two or more recognition probabilities $r_i$.

23 Claims, 3 Drawing Sheets

U.S. PATENT DOCUMENTS

| | | | | |
|---|---|---|---|---|
| 5,535,305 | A | 7/1996 | Acero et al. | 704/256 |
| 5,581,655 | A | 12/1996 | Cohen et al. | 704/245 |
| 5,602,960 | A | 2/1997 | Hon et al. | 704/207 |
| 5,608,840 | A | 3/1997 | Tsuboka | 704/236 |
| 5,615,296 | A | 3/1997 | Stanford et al. | 704/270.1 |
| 5,617,486 | A | 4/1997 | Chow et al. | 382/181 |
| 5,617,509 | A | 4/1997 | Kushner et al. | 704/256 |
| 5,627,939 | A | 5/1997 | Huang et al. | 704/256 |
| 5,649,056 | A | 7/1997 | Nitta | 704/256 |
| 5,649,057 | A | 7/1997 | Lee et al. | 704/256 |
| 5,655,057 | A | 8/1997 | Takagi | 704/233 |
| 5,677,988 | A | 10/1997 | Takami et al. | 704/256 |
| 5,680,506 | A | 10/1997 | Kroon et al. | 704/203 |
| 5,680,510 | A | 10/1997 | Hon et al. | 704/255 |
| 5,696,873 | A | 12/1997 | Bartkowiak | |
| 5,719,996 | A | 2/1998 | Chang et al. | 704/256 |
| 5,745,600 | A | 4/1998 | Chen et al. | 382/218 |
| 5,758,023 | A | 5/1998 | Bordeaux | 704/232 |
| 5,787,396 | A | 7/1998 | Komori et al. | 704/256 |
| 5,794,190 | A | 8/1998 | Linggard et al. | 704/232 |
| 5,799,278 | A | 8/1998 | Cobbett et al. | 704/256 |
| 5,812,974 | A | 9/1998 | Hemphill et al. | 704/256.4 |
| 5,825,978 | A | 10/1998 | Digalakis et al. | 704/256 |
| 5,835,890 | A * | 11/1998 | Matsui et al. | 704/255 |
| 5,860,062 | A | 1/1999 | Taniguchi et al. | 704/256 |
| 5,880,788 | A | 3/1999 | Bregler | 348/515 |
| 5,890,114 | A | 3/1999 | Yi | 704/256 |
| 5,893,059 | A | 4/1999 | Raman | 704/256.2 |
| 5,903,865 | A | 5/1999 | Ishimitsu et al. | 704/256 |
| 5,907,825 | A | 5/1999 | Tzirkel-Hancock | 704/243 |
| 5,913,193 | A | 6/1999 | Huang et al. | |
| 5,930,753 | A | 7/1999 | Potamianos et al. | 704/256.2 |
| 5,937,384 | A | 8/1999 | Huang et al. | 704/256 |
| 5,943,647 | A | 8/1999 | Ranta | 704/251 |
| 5,956,683 | A | 9/1999 | Jacobs et al. | 704/270.1 |
| 5,963,903 | A | 10/1999 | Hon et al. | 704/254 |
| 5,963,906 | A | 10/1999 | Turin | 704/256 |
| 5,983,178 | A | 11/1999 | Naito et al. | 704/245 |
| 5,983,180 | A | 11/1999 | Robinson | 704/254 |
| 6,009,390 | A | 12/1999 | Gupta et al. | 704/240 |
| 6,009,391 | A | 12/1999 | Asghar et al. | 704/243 |
| 6,023,677 | A | 2/2000 | Class et al. | 704/254 |
| 6,035,271 | A | 3/2000 | Chen | |
| 6,061,652 | A | 5/2000 | Tsuboka et al. | 704/245 |
| 6,067,520 | A | 5/2000 | Lee | 704/270 |
| 6,078,884 | A | 6/2000 | Downey | 704/243 |
| 6,092,042 | A | 7/2000 | Iso | 704/240 |
| 6,112,175 | A | 8/2000 | Chengalvarayan | 704/256.5 |
| 6,138,095 | A | 10/2000 | Gupta et al. | 704/234 |
| 6,138,097 | A | 10/2000 | Lockwood et al. | 704/256.2 |
| 6,148,284 | A | 11/2000 | Saul | 704/256.4 |
| 6,151,573 | A | 11/2000 | Gong | 704/256.2 |
| 6,151,574 | A | 11/2000 | Lee et al. | 704/256 |
| 6,188,982 | B1 | 2/2001 | Chiang | 704/256.5 |
| 6,223,159 | B1 | 4/2001 | Ishii | 704/256.7 |
| 6,226,612 | B1 | 5/2001 | Srenger et al. | 704/256.2 |
| 6,236,963 | B1 * | 5/2001 | Naito et al. | 704/241 |
| 6,246,980 | B1 | 6/2001 | Glorion et al. | 704/231 |
| 6,253,180 | B1 | 6/2001 | Iso | 704/244 |
| 6,292,776 | B1 | 9/2001 | Chengalvarayan | 704/219 |
| 6,405,168 | B1 | 6/2002 | Bayya et al. | 704/256 |
| 6,442,519 | B1 | 8/2002 | Kanevsky et al. | |
| 6,446,039 | B1 * | 9/2002 | Miyazawa et al. | 704/255 |
| 6,456,965 | B1 | 9/2002 | Yeldener | |
| 6,526,380 | B1 * | 2/2003 | Thelen et al. | 704/251 |
| 6,629,073 | B1 | 9/2003 | Hon et al. | 704/256.4 |
| 6,662,160 | B1 | 12/2003 | Chien et al. | 704/256 |
| 6,671,666 | B1 | 12/2003 | Ponting et al. | 704/233 |
| 6,671,668 | B2 | 12/2003 | Harris | 704/246 |
| 6,671,669 | B1 | 12/2003 | Garudadri et al. | 704/255 |
| 6,681,207 | B2 | 1/2004 | Garudadri | 704/256 |
| 6,721,699 | B2 | 4/2004 | Xu et al. | |
| 6,801,892 | B2 | 10/2004 | Yamamoto | 704/256 |
| 6,823,305 | B2 * | 11/2004 | Eide | 704/234 |
| 6,829,578 | B1 | 12/2004 | Huang et al. | |
| 6,832,190 | B1 | 12/2004 | Junkawitsch et al. | 704/255 |
| 6,868,382 | B2 | 3/2005 | Shozakai | 704/254 |
| 6,901,365 | B2 | 5/2005 | Miyazawa | 704/256 |
| 6,907,398 | B2 | 6/2005 | Hoege | 704/265 |
| 6,934,681 | B1 | 8/2005 | Emori et al. | 704/250 |
| 6,980,952 | B1 | 12/2005 | Gong | 704/234 |
| 7,003,460 | B1 | 2/2006 | Bub et al. | 704/256 |
| 7,133,535 | B2 | 11/2006 | Huang et al. | 382/100 |
| 7,139,707 | B2 | 11/2006 | Sheikhzadeh-Nadjar et al. | 704/243 |
| 2002/0059068 | A1 * | 5/2002 | Rose et al. | 704/246 |
| 2002/0169604 | A1 * | 11/2002 | Damiba et al. | 704/231 |
| 2002/0193991 | A1 * | 12/2002 | Bennett et al. | 704/247 |
| 2004/0059576 | A1 * | 3/2004 | Lucke | 704/256 |
| 2004/0078195 | A1 * | 4/2004 | Oda et al. | 704/207 |
| 2005/0038655 | A1 * | 2/2005 | Mutel et al. | 704/256 |
| 2005/0065789 | A1 * | 3/2005 | Yacoub et al. | 704/231 |
| 2005/0286705 | A1 * | 12/2005 | Contolini et al. | 379/265.02 |
| 2006/0136207 | A1 * | 6/2006 | Kim et al. | 704/249 |
| 2006/0178876 | A1 | 8/2006 | Sato et al. | |
| 2007/0112566 | A1 | 5/2007 | Chen | 704/240 |
| 2007/0213978 | A1 * | 9/2007 | Schroer et al. | 704/231 |

FOREIGN PATENT DOCUMENTS

| | | |
|---|---|---|
| JP | 60075898 | 4/1985 |
| JP | 60166993 | 8/1985 |
| JP | 02273798 | 11/1990 |
| JP | 2003066991 | 3/2003 |
| JP | 2003514260 | 4/2003 |
| JP | 2005173008 | 6/2005 |
| WO | 0135389 A1 | 5/2001 |
| WO | WO 2004111999 A1 * | 12/2004 |

OTHER PUBLICATIONS

W. H. Abdulla and N. K. Kasabov. 2001. Improving speech recognition performance through gender separation. In Proceedings of ANNES, pp. 218-222.*

Lawrence Rabiner, "A Tutorial on Hidden Markov Models and Selected Application Speech Recognition"—Proceeding of the IEEE, vol. 77, No. 2, Feb. 1989.

Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

G. David Forney, Jr., "The Viterbi Agorithm"—Proceeding of the IEEE, vol. 61, No. 3, p. 268-278, Mar. 1973.

Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.

Hans Werner Strube, "Linear Prediction on a Warped Frequency Scale,"—The Journal of the Acoustical Society of America, vol. 68, No. 4, p. 1071-1076, Oct. 1980.

Leonard E. Baum et al., "A Maximization Technique Occurring in the Statistical Analysis of Probabilistic Functions of Markov Chains,"—The Annals of Mathematical Statistics, vol. 41, No. 1, p. 164-171, Feb. 1970.

Rohit Sinha et al., "Non-Uniform Scaling Based Speaker Normalization" 2002 IEEE, May 13, 2002, vol. 4, pp. 1-589-1-592.

Li Lee et al., "Speaker Normalization Using Efficient Frequency Wraping Procedures" 1996 IEEE, vol. 1, pp. 353-356.

"The International Search Report" and "The Written Opinion of the International Searching Authority" for International application No. PCT/US2007/061707.

U.S. Appl. No. 11/358,001 to inventor Ruxin Chen, filed Feb. 21, 2006.

International Search Report and Written Opinion of the International Searching Authority dated Oct. 27, 2008 for the International Patent Application No. PCT/US07/61707.

Claes et al. "A Novel Feature Transformation for Vocal Tract Length Normalization in Automatic Speech Recognition", IEEE Transformations on Speech and Audio Processing, vol. 6, 1998, pp. 549-557.

Office Action dated May 14, 2008 for U.S. Appl. No. 11/358,001.

Office Action dated Dec. 5, 2008 for U.S. Appl. No. 11/358,001.

Final Office Action dated May 14, 2009 for U.S. Appl. No. 11/358,001.

M. Tamura et al. "Adaptation of Pitch and Spectrum for HMM-Based Speech Synthesis Using MLLR", proc of ICASSP 2001, vol. 1, pp. 1-1, May 2001.

Cherif A, "Pitch and Formants Extraction Algorithm for Speech Processing," Electronics, Circuits and Systems, 2000, ICECS 2000. The 7th IEEE International Conference on vol. 1, Dec. 17-20, 2000, pp. 595-598, vol. 1.

Vergin, R., A. Farhat, and D. O'shaughnessy, Robust gender-dependent acoustic-phonetic modeling in continuous speech recognition based on a new automatic male/female classification, in Proceedings ICSLP 96. Fourth International Conference on Spoken Language Processing, H.T. Bunnell and W. Idsardi, Editors: Philadelphia, PA, USA, pp. 1081-1084, 1996.

Iseli, M., Y. Shue, and A. Alwan (2006)—Age- and Gender-Dependent Analysis of Voice Source Characteristics, Proc. ICASSP, Toulouse.

Notice of Allowance and Fee(s) Due dated Apr. 12, 2010 issued for U.S. Appl. No. 11/358,001.

U.S. Appl. No. 12/841,101, filed Jul. 21, 2010.

Japanese Office Action for Japanese Patent Application No. 2008-556492 dated Jun. 28, 2011.

\* cited by examiner

VOICE RECOGNITION WITH PARALLEL GENDER AND AGE NORMALIZATION

CROSS-REFERENCE TO RELATED APPLICATION

This application is related to commonly-assigned U.S. patent application Ser. No. 11/358,001 entitled "VOICE RECOGNITION WITH SPEAKER ADAPTATION AND REGISTRATION WITH PITCH" by Ruxin Chen, which is filed the same day as the present application, the entire disclosures of which are incorporated herein by reference.

FIELD OF THE INVENTION

This application relates to voice recognition and more particularly to performing multiple voice recognitions with different filter banks.

BACKGROUND OF THE INVENTION

Voice and speech recognition technologies allow computers and other electronic devices equipped with a source of sound input, such as a microphone, to interpret human speech, e.g., for transcription or as an alternative method of interacting with a computer. Speech recognition software is being developed for use in consumer electronic devices such as mobile telephones, game platforms, personal computers and personal digital assistants. In a typical speech recognition algorithm, a time domain signal representing human speech is broken into a number of time windows and each window is converted to a frequency domain signal, e.g., by fast Fourier transform (FFT). This frequency or spectral domain signal is then compressed by taking a logarithm of the spectral domain signal and then performing another FFT. From the compressed spectrum (referred to as a cepstrum), a statistical model can be used to determine phonemes and context within the speech represented by the signal. The cepstrum can be seen as information about rate of change in the different spectral bands within the speech signal. For speech recognition applications, the spectrum is usually first transformed using the Mel Frequency bands. The result is called the Mel Frequency Cepstral Coefficients or MFCCs. A frequency f in hertz (cycles per second) may be converted to a mel frequency m according to: m=(1127.01048 Hz) $\log_e(1+f/700)$. Similarly a mel frequency m can be converted to a frequency f in hertz using: f=(700 Hz) $(e^{m/1127.01048}-1)$.

In voice recognition the spectrum is often filtered using a set of triangular-shaped filter functions. The filter functions divide up the spectrum into a set of partly overlapping bands that lie between a minimum frequency $f_{min}$ and a maximum frequency $f_{max}$. Each filter function is centered on a particular frequency within a frequency range of interest. When converted to the mel frequency scale each filter function may be expressed as a set of mel filter banks where each mel filter bank $MFB_i$ is given by:

$$MFB_i = \left(\frac{mf - mf_{min}}{mf_{max} - mf_{max}}\right) i,$$

where the index i refers to the filter bank number and $mf_{min}$ and $mf_{max}$ are the mel frequencies corresponding to $f_{min}$ and $f_{max}$.

The choice of $f_{min}$ and $f_{max}$ determines the filter banks that are used by a voice recognition algorithm. Typically, $f_{min}$, and $f_{max}$ are fixed by the voice recognition model being used. One problem with voice recognition is that different speakers may have different vocal tract lengths and produce voice signals with correspondingly different frequency ranges. To compensate for this voice recognition systems may perform a vocal tract normalization of the voice signal before filtering. By way of example, the normalization may use a function of the type:

$$f' = f + \frac{1}{\pi \arctan\alpha\left(\frac{\sin(2\pi f)}{1 - \alpha\cos(2\pi f)}\right)}$$

where f' is the normalized frequency and a is a parameter adjusts a curvature of the normalization function.

Unfortunately, since prior art voice recognition systems and methods use fixed values of $f_{min}$, $f_{max}$, $mf_{min}$ and $mf_{max}$ for filtering and normalization, they do not adequately account for variations in vocal tract length amongst speakers. Consequently, speech recognition accuracy may be less than optimal. Thus, there is a need for voice recognition systems and methods that take such variations into account.

SUMMARY OF THE INVENTION

Embodiments of the present invention are directed to methods and apparatus for voice recognition. In embodiments of the invention a voice signal is obtained and two or more voice recognition analyses are performed on the voice signal. Each voice recognition analysis uses a filter bank defined by a different maximum frequency and a different minimum frequency and wherein each voice recognition analysis produces a recognition probability $r_i$ of recognition of one or more speech units, whereby there are two or more recognition probabilities $r_i$. The maximum frequency and the minimum frequency may be adjusted any time speech is windowed and analyzed. A final recognition probability $P_f$ is determined based on the two or more recognition probabilities $r_i$.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

Figure 1A:
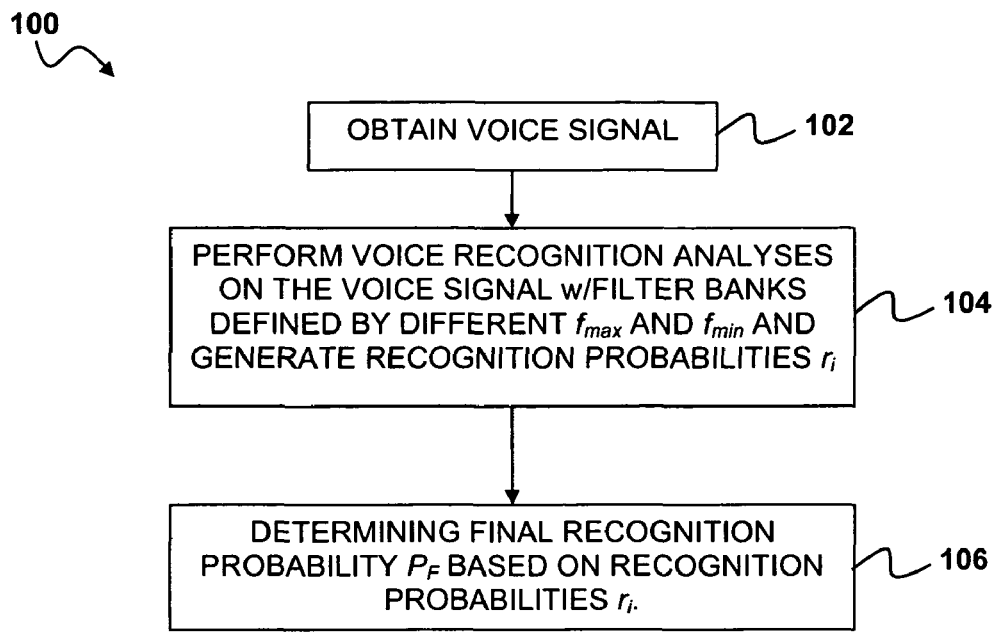
FIG. 1A is a flow diagram illustrating a voice recognition algorithm according to an embodiment of the present invention.

According to an embodiment of the present invention a voice recognition method 100 may proceed as illustrated in FIG. 1A. At 102 a voice signal is obtained. The voice signal may be obtained in any conventional fashion, e.g., using a microphone and a waveform digitizer to put the voice signal into a digital format. The voice signal may be obtained by over-sampling the voice signal at a sampling frequency that is greater than a working feature analysis frequency. In particular, the sampling frequency may be greater than a training time speech sampling rate. By way of example, and without limitation, if the voice signal is characterized by a working feature analysis frequency of 12 kilohertz the signal may be sampled at a sampling frequency of e.g., 16-22 kilohertz.

At 104 two or more voice recognition analyses are performed on the voice signal. Each voice recognition analysis filters the voice signal using a set of filter functions. The filter functions, e.g., triangular-shaped filter functions, divide up the spectrum into a set of partly overlapping bands. Each voice recognition analysis uses a filter bank defined by a different maximum frequency $f_{max}$ and a different minimum frequency $f_{min}$. The $f_{max}$ and $f_{min}$ may be frequencies on the Hertz scale or pitches on the mel scale. The maximum frequency $f_{max}$ refers to an upper limit of the frequency range of the filter bank and the minimum frequency $f_{min}$ refers to a lower limit of the frequency range of the filter bank. Each voice recognition analysis produces a recognition probability $r_i$ of recognition of one or more speech units. The speech units may be phrases, words, or sub-units of words, such as phonemes. Since the filter banks for each voice recognition analysis are based on different values of $f_{max}$ and $f_{min}$ they may produce different recognition probabilities for the same speech unit.

By way of example and without loss of generality, the voice recognition analyses performed at 104 may use a Hidden Markov Model (HMM) to determine the units of speech in a given voice signal. The speech units may be words, two-word combinations or sub-word units, such as phonemes and the like. The HMM may be characterized by:

L, which represents a number of possible states of the system;

M, which represents the total number of Gaussians that exist in the system;

N, which represents the number of distinct observable features at a given time; these features may be spectral (i.e., frequency domain) or temporal (time domain) features of the speech signal;

$A = \{a_{ij}\}$, a state transition probability distribution, where each $a_{ij}$ represents the probability that the system will transition to the $j^{th}$ state at time t+1 if the system is initially in the $i^{th}$ state at time t;

$B = \{b_j(k)\}$, an observation feature probability distribution for the $j^{th}$ state, where each $b_j(k)$ represents the probability distribution for observed values of the $k^{th}$ feature when the system is in the $j^{th}$ state; and $\pi = \{\pi_i\}$, an initial state distribution, where each component $\pi_i$ represents the probability that the system will be in the $i^{th}$ state at some initial time.

The Hidden Markov Models can be applied to the voice signal to solve one or more basic problems including: (1) the probability of a given sequence of observations obtained from the voice signal; (2) given the observation sequence, what corresponding state sequence best explains the observation sequence; and (3) how to adjust the set of model parameters A, B π to maximize the probability of a given observation sequence.

The application of HMMs to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes.

The voice recognition analyses implemented at 104 may characterize speech by a number of recognizable patterns known as phonemes. Each of these phonemes can be broken down in a number of parts, e.g., a beginning, middle and ending part. It is noted that the middle part is typically the most stable since the beginning part is often affected by the preceding phoneme and the ending part is affected by the following phoneme. The different parts of the phonemes are characterized by frequency domain features that can be recognized by appropriate statistical analysis of the signal. The statistical model often uses Gaussian probability distribution functions to predict the probability for each different state of the features that make up portions of the signal that correspond to different parts of different phonemes. One HMM state can contain one or more Gaussians. A particular Gaussian for a given possible state, e.g., the $k^{th}$ Gaussian can be represented by a set of N mean values $\mu_{ki}$ and variances $\sigma_{ki}$. In a typical speech recognition algorithm one determines which of the Gaussians for a given time window is the largest one. From the largest Gaussian one can infer the most probable phoneme for the time window.

By way of example, each voice recognition analysis at 104 may analyze a time domain signal to obtain N different observable signal features $x_0 \ldots x_n$, where n=N−1. The observed feature of the system may be represented as a vector having components $x_0 \ldots x_n$. These components may be spectral, cepstral, or temporal features of a given observed speech signal.

By way of example and without limitation of the embodiments of the invention, the components $x_0 \ldots x_n$ may be cepstral coefficients of the speech signal. A cepstrum is the result of taking the Fourier transform (FT) of the decibel spectrum as if it were a signal. The cepstrum of a time domain speech signal may be defined verbally as the Fourier transform of the log (with unwrapped phase) of the Fourier transform of the time domain signal. The cepstrum of a time domain signal S(t) may be represented mathematically as $FT(\log(FT(S(t))) + j2\pi q)$, where q is the integer required to properly unwrap the angle or imaginary part of the complex log function. Algorithmically: the cepstrum may be generated by the sequence of operations: signal→FT→log→phase unwrapping→FT→cepstrum.

There is a complex cepstrum and a real cepstrum. The real cepstrum uses the logarithm function defined for real values, while the complex cepstrum uses the complex logarithm function defined for complex values also. The complex cepstrum holds information about magnitude and phase of the initial spectrum, allowing the reconstruction of the signal. The real cepstrum only uses the information of the magnitude of the spectrum. By way of example and without loss of generality, the voice recognition analysis implemented at 104 may use the real cepstrum.

Certain patterns of combinations of components $x_0 \ldots x_n$ correspond to units of speech (e.g., words or phrases) or sub-units, such as syllables, phonemes or other sub-units of words. Each unit or sub-unit may be regarded as a state of the system. The probability density function $f_k(x_0 \ldots x_n)$ for a given Gaussian of the system (the $k^{th}$ Gaussian) may be any type of probability density function, e.g., a Gaussian function having the following form:

$$f_k(x_0 \ldots x_n) = \frac{1}{\sqrt{\delta_k}} \exp\left(-\sum_i \frac{(x_i - \mu_{ki})^2}{2 \cdot \sigma_{ki}^2}\right) \quad (1)$$

where $$\delta_k = \prod_i (2\pi \cdot \sigma_{ki}^2) \; i = 1 \ldots N, \; k = 1 \ldots M.$$

In the above equations, "i" is an index for feature and "k" is an index for Gaussian. In equation (1), the subscript k is an index for the Gaussian function. There may be several hundred to several hundred thousand Gaussians used by the speech recognition algorithm. The quantity $\mu_{ki}$ is a mean value for the feature $x_i$ in the $k^{th}$ Gaussian of the system. The quantity $\sigma_{ki}^2$ is the variance for $x_i$ in the $k^{th}$ Gaussian. One or more Gaussians may be associated with one or more different states. For example, there may be L different states, which contain a total number of M Gaussians in the system. The quantity $\mu_{ki}$ is the mean for all measurements of $x_i$ that belong to $f_k(x_0 \ldots x_N)$ over all time windows of training data and $\sigma_{ki}$ is the variance for the corresponding measurements used to compute $\mu_{ki}$.

The probability for each Gaussian can be computed equation (1) to give a corresponding recognition probability $r_i$. Note that each analysis taken at 104 with different values of $f_{min}$ and $f_{max}$, may produce a number of different recognition probabilities corresponding to different possible results for the speech unit that was recognized. By comparing different recognition probabilities for the same speech unit generated using different filter banks more reliable speech recognition may be obtained. In the analysis at 104 the maximum frequency and the minimum frequencies for the filter banks may be adjusted any time speech is windowed and analyzed.

In particular embodiments, the recognition analyses at 104 may include a first voice recognition analysis based on a first maximum frequency $f_{max}$ and a first minimum frequency $f_{min}$ and one or more additional voice recognition analyses based on a different maximum frequency given by $f_{max} \pm f_{max}$ and a different minimum frequency given by $f_{min} \pm f_{min}$. In general $\Delta f_{max} < f_{max}$ and $\Delta f_{min} < f_{min}$. The parameters $f_{min}$ and $f_{max}$ may be adjusted dynamically during the first voice recognition. In particular $f_{min}$ and $f_{max}$ may be adjusted at any time window during the first voice recognition. By way of example, and without limitation of the invention, $\Delta f_{min}$ may be between about 1% and about 5% of $f_{min}$. Similarly, $\Delta f_{max}$ may be between about 1% and about 5% of $f_{max}$. These different voice recognition analyses may be performed in parallel, e.g., as discussed below.

In a particular embodiment, the additional voice recognition analyses may include a second voice recognition analysis based on a maximum frequency given by $f_{max} - \Delta f_{max}$ and a minimum frequency given by $f_{min} - \Delta f_{min}$; a third voice recognition analyses is based on a maximum frequency given by $f_{max} + \Delta f_{max}$ and a minimum frequency given by $f_{min} - \Delta f_{min}$; a fourth voice recognition analysis based on a maximum frequency given by $f_{max} - \Delta f_{max}$ and a minimum frequency given by $f_{min} + \Delta f_{min}$; and a fifth voice recognition analysis based on a maximum frequency given by $f_{max} + \Delta f_{max}$ and a minimum frequency given by $f_{min} + \Delta f_{min}$. These five different voice recognition analyses may be performed in parallel, e.g., as discussed below. Each of these different voice recognition analyses uses same values of the parameters $f_{min}$ and $f_{max}$. In general, $f_{min}$ and $f_{max}$ are different from each other.

At 106, a final recognition probability $P_f$ is determined based on the two or more recognition probabilities $r_i$. By way of example, the final recognition probability $P_f$ may be determined by selecting a maximum probability of the recognition probabilities $r_i$ as the final recognition probability. By way of example, and without limitation, the final recognition probability may be determined by selecting a maximum probability of the two or more recognition probabilities $r_i$ as the final recognition probability. Specifically, after all the recognition probabilities $r_i$ have been computed a maximum probability may be determined. From the Gaussian having the maximum probability one can build a most likely, state, word, phoneme, character, etc. for that particular time window. Note that it is also possible to use the most probable state for a given time window to help in determining the most probable state for earlier or later time windows, since these may determine a context in which the state occurs.

Figure 1B:
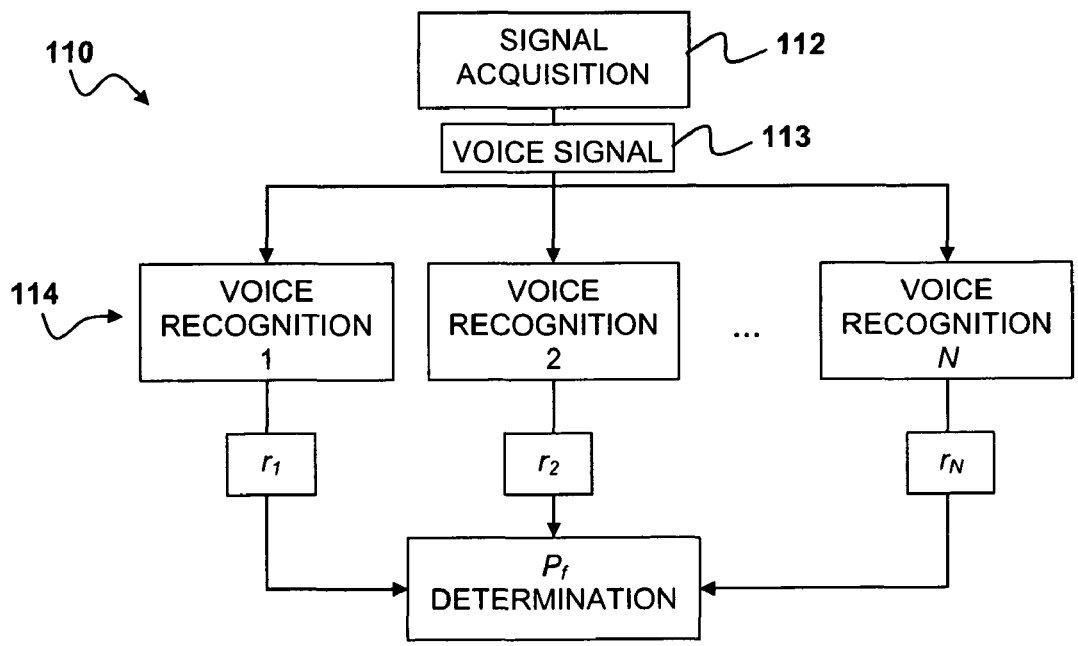
FIG. 1B is a flow diagram illustrating parallel processing implementation of a voice recognition algorithm according to an embodiment of the present invention.

In certain embodiments of the present invention two or more voice recognition analyses may be performed in parallel at 104. FIG. 1B depicts an example of a parallel processing of multiple voice recognition routines. As used herein, the term parallel processing generally refers to executing parts of a process before other parts have been completed. Parallel processing may be implemented, e.g., through the use of pipelining, time multiplexing, multiple processors or some combination of two or more of these. As shown in FIG. 1B a voice recognition method 110 may include signal acquisition at 112, N parallel voice recognition analyses at 114 that produce corresponding recognition probabilities $r_1, r_2 \ldots r_N$, and a final probability determination at 116. It is noted that the parallel recognition analyses 114 may be performed in software, hardware or some combination of hardware and software.

Figure 1C:
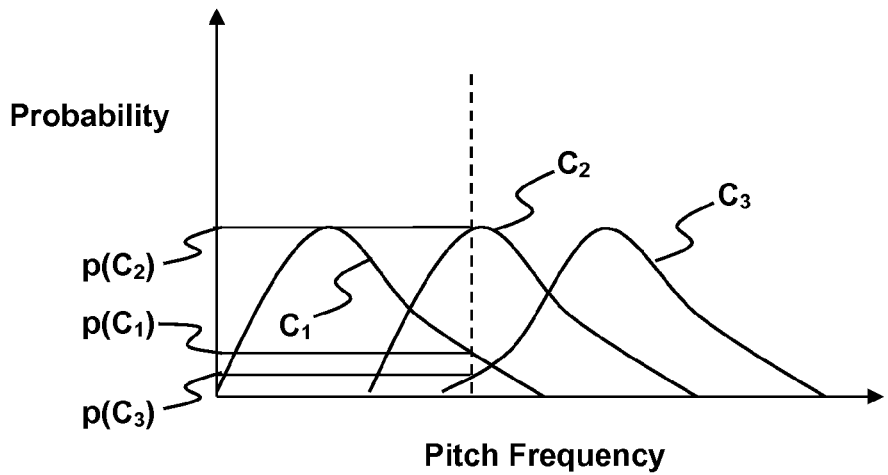
FIG. 1C is a graph illustrating different category probability distributions for voice recognition analysis according to an alternative embodiment of the present invention.

The voice recognition analyses performed on the voice signal at 104 of FIG. 1A and/or 114 of FIG. 1B may have different speaker category assumptions. Such assumptions may be based, e.g., on assumptions about the age or gender of the speaker. Age or gender information about the speaker need not be known. Instead multiple voice signal analyses at 113 may be performed using different assumptions. The final recognition probability $P_f$ may be weighted according to one or more speaker category probabilities associated with the different speaker category assumptions. Each probability may be associated with some distribution based on a parameter of the voice signal e.g., an average pitch for the voice signal. These probability distributions may be determined off line based on training data. For example, as illustrated in FIG. 1C, three different speaker categories may have associated with them corresponding probability distributions $C_1, C_2$ and $C_3$ as a function of pitch. An average pitch value for the voice signal may have associated with it three different corresponding speaker category probabilities $p(C_1), p(C_2)$ and $p(C_3)$. Voice recognition analyses based on different values of $f_{min}$, and $f_{max}$ for each of categories $C_1, C_2, C_3$ may generate recognition probabilities $r_1, r_2$ and $r_3$. The final recognition probability $P_f$ may be the maximum of the weighted recognition probabilities given by $p(C_1) \times r_1, p(C_2) \times r_1$ and $p(C_3) \times r_1$. Alternatively, the final recognition probability $P_f$ may be determined by:

$$P_f = \sum_i (C_i \times r_i),$$

where $C_1$ is a probability that a speaker is a member of the $i^{th}$ category and $r_i$ is a recognition probability resulting from a voice analysis that assumes the speaker is a member of the $i^{th}$ category.

By way of example, the speaker recognition categories may be based on assumptions about the speaker's age and/or gender. Thus, performing two or more voice recognition analyses on the voice signal at 104 may include performing one or more gender-specific and/or age-specific voice recognition analyses. For example the values of $f_{min}$ and $f_{max}$ for the different voice recognition analyses may be selected based on different assumptions about whether the speaker is a man, a woman or a child. For example, if it is assumed that the speaker is a man, $f_{max}$ may be about 70 Hz and $f_{min}$ may be about 3800 Hz. If it is assumed that the speaker is a woman, $f_{max}$ may be about 70 Hz and $f_{min}$ may be about 4200 Hz. If it is assumed that the speaker is a child, $f_{max}$ may be about 90 Hz and $f_{min}$ may be about 4400 Hz. In a particular embodiment, a first voice recognition may be based on an assumption that the voice signal is obtained from a male speaker; a second voice recognition may be based on an assumption that the voice signal is obtained from a female speaker and a third voice recognition may be based on an assumption that the voice signal is obtained from a child speaker. The final probability may be based on the resulting recognition probabilities for these three analyses.

In other embodiments of the invention, a confidence measure may be determined based on the final recognition probability $P_f$ and the recognition probabilities $r_i$. By way of example, the confidence measure may be a maximum of the recognition probabilities $r_i$ divided by a sum of all of the recognition probabilities $r_i$. The confidence measure may be used as a criterion for acceptance of the final recognition probability. For example, if the acceptance criteria is below some threshold value, the result will not be accepted. In such a case, a system employing the method 100 may provide feedback to the user, e.g., displaying a message asking the speaker to repeat the phrase spoken most recently.

Figure 2:
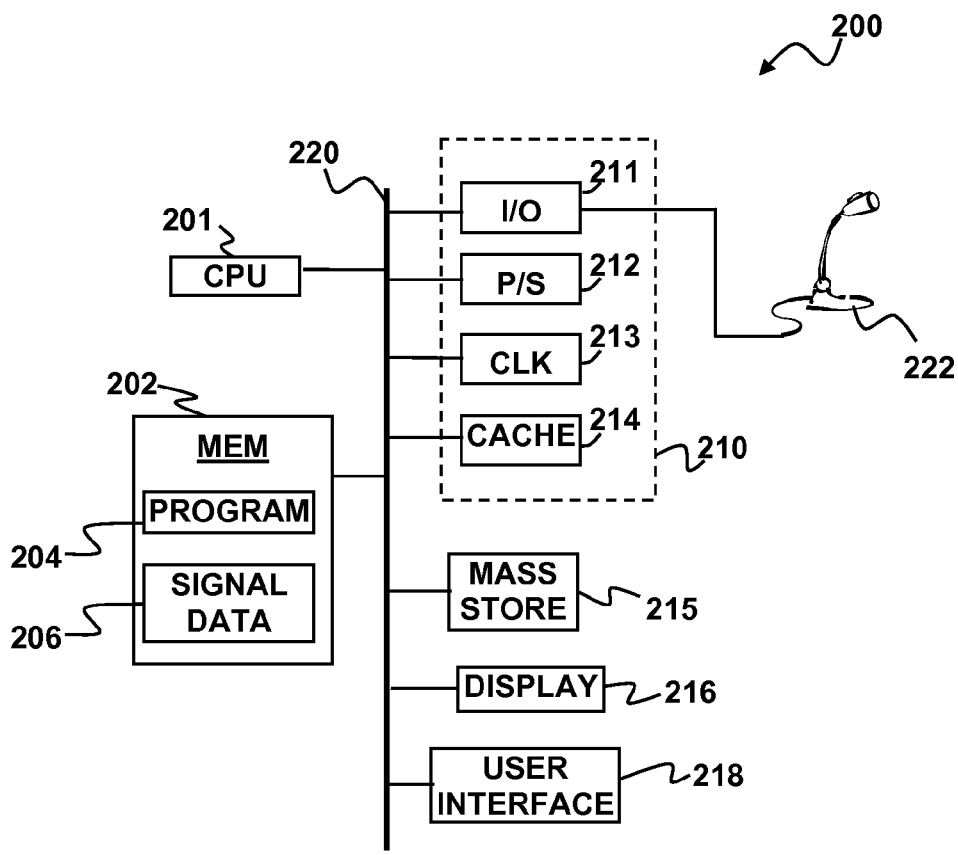
FIG. 2 is a block diagram illustrating a voice recognition system according to an embodiment of the present invention.

According to embodiments of the present invention, a recognition method (e.g., a voice recognition method) of the type depicted in FIG. 1A or FIG. 1B operating as described above may be implemented as part of a signal processing apparatus 200, as depicted in FIG. 2. The system 200 may include a processor 201 and a memory 202 (e.g., RAM, DRAM, ROM, and the like). In addition, the signal processing apparatus 200 may have multiple processors 201 if parallel processing is to be implemented. The memory 202 includes data and code configured as described above. Specifically, the memory includes data representing signal features 204, and probability functions 206 each of which may include code, data or some combination of both code and data.

The apparatus 200 may also include well-known support functions 210, such as input/output (I/O) elements 211, power supplies (P/S) 212, a clock (CLK) 213 and cache 214. The apparatus 200 may optionally include a mass storage device 215 such as a disk drive, CD-ROM drive, tape drive, or the like to store programs and/or data. The controller may also optionally include a display unit 216 and user interface unit 218 to facilitate interaction between the controller 200 and a user. The display unit 216 may be in the form of a cathode ray tube (CRT) or flat panel screen that displays text, numerals, graphical symbols or images. The user interface 218 may include a keyboard, mouse, joystick, light pen or other device. In addition, the user interface 218 may include a microphone, video camera or other signal transducing device to provide for direct capture of a signal to be analyzed. The processor 201, memory 202 and other components of the system 200 may exchange signals (e.g., code instructions and data) with each other via a system bus 220 as shown in FIG. 2. A microphone 222 may be coupled to the apparatus 200 through the I/O functions 211

As used herein, the term I/O generally refers to any program, operation or device that transfers data to or from the system 200 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, camera, external Zip drive or scanner as well as internal devices, such as a CD-ROM drive, CD-R drive or internal modem or other peripheral such as a flash memory reader/writer, hard drive.

The processor 201 may perform signal recognition on signal data 206 as described above in response to the data 206 and program code instructions of a program 204 stored and retrieved by the memory 202 and executed by the processor module 201. Code portions of the program 203 may conform to any one of a number of different programming languages such as Assembly, C++, JAVA or a number of other languages. The processor module 201 forms a general-purpose computer that becomes a specific purpose computer when executing programs such as the program code 204. Although the program code 204 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both.

In one embodiment, among others, the program code 204 may include a set of processor readable instructions that implement a method having features in common with the method 100 of FIG. 1A or the method 110 of FIG. 1B. The program code 204 may generally include one or more instructions that direct the one or more processors to perform two or more voice recognition analyses on the voice signal and an instruction to determine a final recognition probability $P_f$ based on the two or more recognition probabilities. Each voice recognition analysis may use a filter bank defined by a different maximum frequency and a different minimum frequency. Each voice recognition analysis may produces a recognition probability $r_i$ of recognition of one or more speech units.

Figure 3:
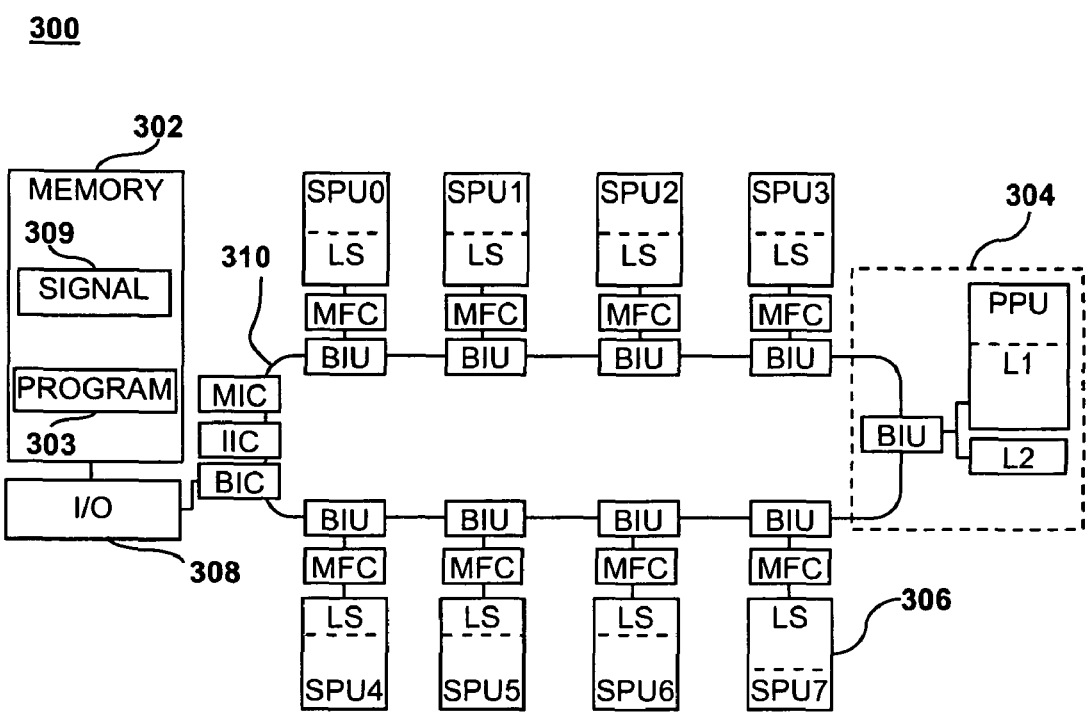
FIG. 3 is a block diagram of a cell processor implementation of a cell processor recognition system according to an embodiment of the present invention.

By way of example, embodiments of the present invention may be implemented on parallel processing systems. Such parallel processing systems typically include two or more processor elements that are configured to execute parts of a program in parallel using separate processors. By way of example, and without limitation, FIG. 3 illustrates a type of cell processor 300 according to an embodiment of the present invention. The cell processor 300 may be used as the processor 201 of FIG. 3. In the example depicted in FIG. 3, the cell processor 300 includes a main memory 302, power processor element (PPE) 304, and a number of synergistic processor elements (SPEs) 306. In the example depicted in FIG. 3, the cell processor 300 includes a single PPE 304 and eight SPE 306. In such a configuration, seven of the SPE 306 may be used for parallel processing and one may be reserved as a back-up in case one of the other seven fails. A cell processor may alternatively include multiple groups of PPEs (PPE groups) and multiple groups of SPEs (SPE groups). In such a case, hardware resources can be shared between units within a group. However, the SPEs and PPEs must appear to software as independent elements. As such, embodiments of the present invention are not limited to use with the configuration shown in FIG. 3

The main memory 302 typically includes both general-purpose and nonvolatile storage, as well as special-purpose hardware registers or arrays used for functions such as system configuration, data-transfer synchronization, memory-mapped I/O, and I/O subsystems. In embodiments of the present invention, a voice recognition program 303 and signal 309 may be resident in main memory 302. The voice recognition program 303 may be configured as described with respect to FIG. 1A and/or FIG. 1B above. The voice recognition program 303 may run on the PPE. The program 303 may be divided up into multiple voice recognition tasks that can be executed on the SPEs and/or PPE.

By way of example, the PPE 304 may be a 64-bit PowerPC Processor Unit (PPU) with associated caches L1 and L2. The PPE 304 is a general-purpose processing unit, which can access system management resources (such as the memory-protection tables, for example). Hardware resources may be mapped explicitly to a real address space as seen by the PPE. Therefore, the PPE can address any of these resources directly by using an appropriate effective address value. A primary function of the PPE 304 is the management and allocation of tasks for the SPEs 306 in the cell processor 300.

Although only a single PPE is shown in FIG. 3, some cell processor implementations, such as cell broadband engine architecture (CBEA), the cell processor 300 may have multiple PPEs organized into PPE groups, of which there may be more than one. These PPE groups may share access to the main memory 302. Furthermore the cell processor 300 may include two or more groups SPEs. The SPE groups may also share access to the main memory 302. Such configurations are within the scope of the present invention.

Each SPE 306 is includes a synergistic processor unit (SPU) and its own local storage area LS. The local storage LS may include one or more separate areas of memory storage, each one associated with a specific SPU. Each SPU may be configured to only execute instructions (including data load and data store operations) from within its own associated local storage domain. In such a configuration, data transfers between the local storage LS and elsewhere in a system 300 may be performed by issuing direct memory access (DMA) commands from the memory flow controller (MFC) to transfer data to or from the local storage domain (of the individual SPE). The SPUs are less complex computational units than the PPE 304 in that they do not perform any system management functions. The SPU generally have a single instruction, multiple data (SIMD) capability and typically process data and initiate any required data transfers (subject to access properties set up by the PPE) in order to perform their allocated tasks. The purpose of the SPU is to enable applications that require a higher computational unit density and can effectively use the provided instruction set. A significant number of SPEs in a system managed by the PPE 304 allow for cost-effective processing over a wide range of applications.

Each SPE 306 may include a dedicated memory flow controller (MFC) that includes an associated memory management unit that can hold and process memory-protection and access-permission information. The MFC provides the primary method for data transfer, protection, and synchronization between main storage of the cell processor and the local storage of an SPE. An MFC command describes the transfer to be performed. Commands for transferring data are sometimes referred to as MFC direct memory access (DMA) commands (or MFC DMA commands).

Each MFC may support multiple DMA transfers at the same time and can maintain and process multiple MFC commands. Each MFC DMA data transfer command request may involve both a local storage address (LSA) and an effective address (EA). The local storage address may directly address only the local storage area of its associated SPE. The effective address may have a more general application, e.g., it may be able to reference main storage, including all the SPE local storage areas, if they are aliased into the real address space.

To facilitate communication between the SPEs 306 and/or between the SPEs 306 and the PPE 304, the SPEs 306 and PPE 304 may include signal notification registers that are tied to signaling events. The PPE 304 and SPEs 306 may be coupled by a star topology in which the PPE 304 acts as a router to transmit messages to the SPEs 306. Alternatively, each SPE 306 and the PPE 304 may have a one-way signal notification register referred to as a mailbox. The mailbox can be used by an SPE 306 to host operating system (OS) synchronization.

The cell processor 300 may include an input/output (I/O) function 308 through which the cell processor 300 may interface with peripheral devices, such as a microphone used to acquire a voice signal. In addition an Element Interconnect Bus 310 may connect the various components listed above. Each SPE and the PPE can access the bus 310 through a bus interface units BIU. The cell processor 300 may also includes two controllers typically found in a processor: a Memory Interface Controller MIC that controls the flow of data between the bus 310 and the main memory 302, and a Bus Interface Controller BIC, which controls the flow of data between the I/O 308 and the bus 310. Although the requirements for the MIC, BIC, BIUs and bus 310 may vary widely for different implementations, those of skill in the art will be familiar their functions and circuits for implementing them.

The cell processor 300 may also include an internal interrupt controller IIC. The IIC component manages the priority of the interrupts presented to the PPE. The IIC allows interrupts from the other components the cell processor 300 to be handled without using a main system interrupt controller. The IIC may be regarded as a second level controller. The main system interrupt controller may handle interrupts originating external to the cell processor.

In embodiments of the present invention, the voice recognition analyses 104, 114 described above may be performed in parallel using the PPE 304 and/or one or more of the SPE 306. Each voice recognition analysis may be run as one or more separate tasks that different SPE 306 may take as they become available.

Embodiments of the present invention provide for more robust and more accurate speech recognition. Those of skill in the art will recognize that embodiments of the present invention may be readily applied to other types of recognition algorithms, including optical character recognition.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including meansplus-function limitations, unless such a limitation is explicitly recited in a given claim using the phrase "means for."

What is claimed is:

1. A method for voice recognition, the method comprising:
obtaining a voice signal;
performing two or more voice recognition analyses in parallel on the voice signal, wherein each voice recognition analysis uses a filter bank defined by a different maximum frequency and a different minimum frequency and wherein each voice recognition analysis produces a recognition probability $r_i$ of recognition of one or more speech units, whereby there are two or more recognition probabilities $r_i$, wherein each recognition probability $r_i$ represents a probability that the voice signal matches a recognized unit of speech, wherein performing the two or more voice recognition analyses in parallel includes performing a first voice recognition analysis on the voice signal based on a first maximum frequency $f_{max}$ and a first minimum frequency $f_{min}$; wherein $f_{min}$ and $f_{max}$ are adjusted dynamically during the first voice recognition; and
performing one or more additional voice recognition analyses on the voice signal based on a different maximum frequency given by $f_{max} \pm \Delta f_{max}$ and a different minimum frequency given by $f_{min} \pm \Delta f_{min}$, where $\Delta f_{max} < f_{max}$ and $\Delta f_{min} < f_{min}$; and
determining a final recognition probability $P_f$ based on the two or more recognition probabilities $r_i$;
determining a confidence measure based on the final recognition probability and the two or more recognition probabilities $r_i$; and
using the confidence measure as an acceptance criterion for the final recognition probability $P_f$ after determining the final recognition probability $P_f$.

2. The method of claim 1 wherein determining the final recognition probability includes selecting a maximum probability of the two or more recognition probabilities as the final recognition probability $P_f$.

3. The method of claim 1 wherein obtaining a voice signal includes over-sampling the voice signal at a sampling frequency that is greater than a working feature analysis frequency.

4. The method of claim 3 wherein the sampling frequency is greater than a training time speech sampling rate.

5. The method of claim 1 wherein $f_{min}$ and $f_{max}$ are adjusted for each time window of the first voice recognition.

6. The method of claim 1 wherein different voice recognition analyses use the same values of $f_{min}$ and $f_{max}$.

7. The method of claim 1 wherein $\Delta f_{min}$ is between about 1% and about 5% of $f_{min}$.

8. The method of claim 1 wherein $\Delta f_{max}$ is between about 1% and about 5% of $f_{max}$.

9. The method of claim 1 wherein performing one or more additional voice recognition analyses includes:
performing a second voice recognition analysis based on a maximum frequency given by $f_{max} - \Delta f_{max}$ and a minimum frequency given by $f_{min} - \Delta f_{min}$;
performing a third voice recognition analyses is based on a maximum frequency given by $f_{max} + \Delta f_{max}$ and a minimum frequency given by $f_{min} - \Delta f_{max}$;
performing a fourth voice recognition analysis based on a maximum frequency given by $f_{max} - \Delta f_{max}$ and a minimum frequency given by $f_{min} + \Delta f_{max}$; and
performing a fifth voice recognition analysis based on a maximum frequency given by $f_{max} + \Delta f_{max}$ and a minimum frequency given by $f_{min} + \Delta f_{min}$.

10. The method of claim 9 wherein the first, second, third, fourth and fifth voice recognition analyses are performed in parallel.

11. The method of claim 1 wherein performing two or more voice recognition analyses on the voice signal includes performing one or more gender-specific and/or age-specific voice recognition analyses.

12. The method of claim 1 wherein performing two or more voice recognition analyses on the voice signal includes performing two or more voice recognition analyses having different speaker category assumptions.

13. The method of claim 12 wherein determining the final recognition probability includes weighting the final recognition probability according to one or more speaker category probabilities associated with the different speaker category assumptions.

14. The method of claim 11 wherein the final recognition probability $P_f$ is determined by:

$$P_f = \sum_i (C_i \times r_i),$$

where $C_i$ is a probability that a speaker is a member of the $i^{th}$ category and $r_i$ is a recognition probability resulting from a voice analysis that assumes the speaker is a member of the $i^{th}$ category.

15. The method of claim 12 wherein performing two or more voice recognition analyses having different speaker category assumptions includes:
performing a first voice recognition based on an assumption that the voice signal is obtained from a male speaker;
performing a second voice recognition based on an assumption that the voice signal is obtained from a female speaker;
performing a third voice recognition based on an assumption that the voice signal is obtained from a child speaker.

16. The method of claim 1 wherein the confidence measure is a maximum of the two or more recognition probabilities $r_i$, divided by a sum of the two or more recognition probabilities $r_i$.

17. The method of claim 1 wherein performing two or more voice recognition analyses on the voice signal includes adjusting the maximum frequency and the minimum frequency every time speech is windowed and analyzed.

18. A voice recognition system, comprising:
an interface adapted to obtain a voice signal;
one or more processors coupled to the interface; and
a memory coupled to the interface and the processor, the memory having embodied therein a set of processor readable instructions for configured to implement a method for voice recognition, the processor readable instructions including:
one or more instructions that direct the one or more processors to perform two or more voice recognition analyses in parallel on the voice signal, wherein each voice recognition analysis uses a filter bank defined by a different maximum frequency and a different minimum frequency and wherein each voice recognition analysis produces a recognition probability $r_i$, of recognition of one or more speech units, whereby there are two or more recognition probabilities $r_i$, wherein each recognition probability $r_i$ represents a probability that the voice signal matches a recognized unit of speech, wherein each recognition probability $r_i$ represents a probability that the voice signal matches a recognized unit of speech, wherein performing the two or more voice recognition analyses in parallel includes performing a first voice recognition analysis on the voice signal based on a first maximum frequency $f_{max}$ and a first minimum frequency $f_{min}$; wherein $f_{min}$ and $f_{max}$ are adjusted dynamically during the first voice recognition; and performing one or more additional voice recognition analyses on the voice signal based on a different maximum frequency given by $f_{max} \pm \Delta f_{max}$ and a different minimum frequency given by $f_{min} \pm \Delta f_{min}$, where $\Delta f_{max} < f_{max}$ and $\Delta f_{min} < f_{min}$; and an instruction to determine a final recognition probability $P_f$ based on the two or more recognition probabilities; and an instruction to determine a confidence measure based on the final recognition probability and the two or more recognition probabilities $r_i$; and an instruction to use the confidence measure as an acceptance criterion for the final recognition probability $P_f$ after determining the final recognition probability $P_f$.

19. The system of claim 18 wherein the one or more processors include two or more processor elements configured to perform parallel processing.

20. The system of claim 19 wherein the two or more processor units include a power processor element and one or more synergistic processor elements.

21. The system of claim 19 wherein the one or more instructions that direct the one or more processors to perform two or more voice recognition analyses on the voice signal are configured to perform the two or more voice recognition analyses in parallel.

22. The system of claim 18 wherein one or more instructions that direct the one or more processors to perform two or more voice recognition analyses adjust the maximum frequency and the minimum every time speech is windowed and analyzed.

23. The method of claim 1, wherein using the confidence measure as an acceptance criterion for the final recognition probability $P_f$ includes comparing the confidence measure to a threshold value and rejecting the final recognition probability $P_f$ if the confidence measure is below the threshold value.

* * * * *